US 11,710,950 B2

(12) United States Patent
Morris et al.

(10) Patent No.: US 11,710,950 B2
(45) Date of Patent: Jul. 25, 2023

(54) CUTTING BLADE AND CUTTING DEPTH CONTROL DEVICE

(71) Applicant: TE Connectivity Services GmbH, Schaffhausen (CH)

(72) Inventors: Michael Morris, Middletown, PA (US); Christopher John Gavlak, Middletown, PA (US); Thomas Emery Backenstoes, Middletown, PA (US); Isaac Cruz, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 115 days.

(21) Appl. No.: 17/153,460

(22) Filed: Jan. 20, 2021

(65) Prior Publication Data
US 2022/0231493 A1    Jul. 21, 2022

(51) Int. Cl.
*H02G 1/12* (2006.01)
*H01R 43/28* (2006.01)
(52) U.S. Cl.
CPC ........... *H02G 1/1265* (2013.01); *H01R 43/28* (2013.01)
(58) Field of Classification Search
USPC .............................................. 81/9.51; 83/883
See application file for complete search history.

(56) References Cited

U.S. PATENT DOCUMENTS

| | | | | |
|---|---|---|---|---|
| 3,403,441 A | * | 10/1968 | Eubanks | H02G 1/127 30/90.1 |
| 3,893,199 A | * | 7/1975 | Todaro | H02G 1/1214 D8/58 |
| 4,059,893 A | * | 11/1977 | Solury | H02G 1/1265 81/9.41 |
| 5,010,797 A | * | 4/1991 | Stepan | H02G 1/1265 83/885 |
| 5,337,633 A | * | 8/1994 | Carpenter et al. | H02G 1/127 81/9.51 |
| 6,370,759 B1 | * | 4/2002 | Shimizu | H02G 1/1265 29/33 M |
| 2005/0211025 A1 | * | 9/2005 | Steuri et al. | H02G 1/1256 81/9.51 |

(Continued)

FOREIGN PATENT DOCUMENTS

| | | | |
|---|---|---|---|
| CN | 113991553 A | * | 1/2022 |
| WO | 2605040615 A1 | | 5/2005 |

(Continued)

OTHER PUBLICATIONS

International Search Report, PCT/IS2022/050476 Filing Date Jan. 20, 2022.

*Primary Examiner* — Hwei-Siu C Payer (57) ABSTRACT

A cutting blade assembly for use with a rotating cable preparation device includes a cutting blade defining a cutting edge and adapted to attach to a rotating member of the cable preparation device. The cutting blade assembly is selectively movable in a cutting direction for at least partially cutting a cable held by the device. The assembly further comprises a blade stop positioned adjacent to the cutting edge of the blade and defining a stop surface. The stop surface is arranged at a predetermined distance from the cutting edge of the blade in a depth direction of the blade, and extends in a direction generally perpendicular to the cutting direction and generally parallel to an axis of the cable.

20 Claims, 6 Drawing Sheets

(56) References Cited

U.S. PATENT DOCUMENTS

| | | | | |
|---|---|---|---|---|
| 2011/0174115 A1* | 7/2011 | Shimizu | ............... | H02G 1/1256 |
| | | | | 81/9.42 |
| 2013/0269487 A1* | 10/2013 | Sumino et al. | ...... | H02G 1/1265 |
| | | | | 81/9.51 |
| 2020/0303910 A1* | 9/2020 | Houser | .................. | H02G 1/127 |
| 2021/0119426 A1* | 4/2021 | Backenstoes | ........ | H02G 1/1265 |
| 2022/0045491 A1 | 2/2022 | Gundel et al. | | |
| 2022/0231493 A1* | 7/2022 | Morris | ................. | H02G 1/1265 |

FOREIGN PATENT DOCUMENTS

| WO | WO 2020/132502 A1 * | 6/2020 |
|---|---|---|
| WO | WO 2020/216835 A1 * | 10/2020 |
| WO | WO 2021/079317 A1 * | 4/2021 |

\* cited by examiner

CUTTING BLADE AND CUTTING DEPTH CONTROL DEVICE

FIELD OF THE INVENTION

The present disclosure relates to cutting devices, and more particularly, to a device for limiting the depth of a cut made through an electrical cable with a rotating cutting blade of a cable preparation machine.

BACKGROUND

Figure 1:
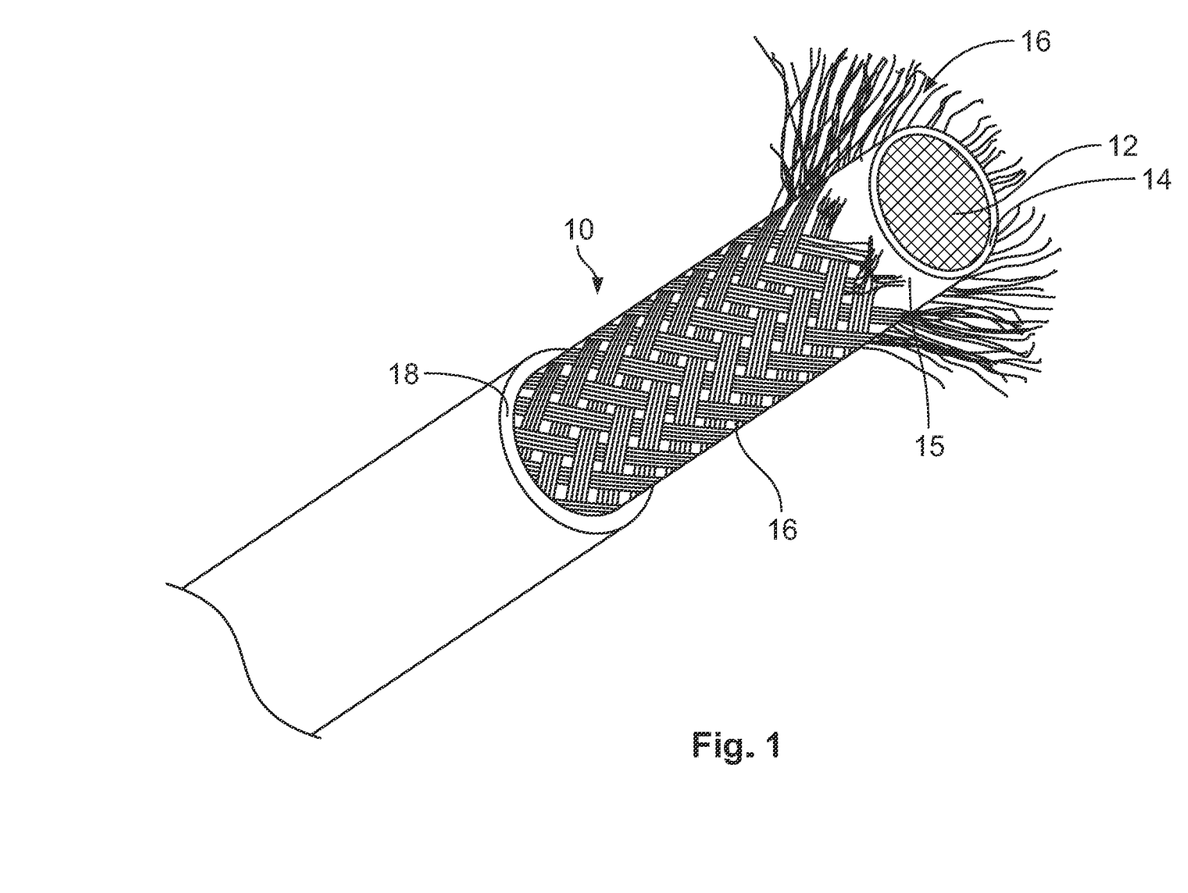
FIG. 1 is a perspective view of an exemplary multi-layer high voltage electrical cable useful for describing embodiments of the present disclosure.

The preparation of wire and cable for use in electrical systems is time consuming and expensive. In some applications, a cable may comprise several layers, including those made of materials which are difficult to selectively remove or otherwise process during, for example, connectorization of the cable. High voltage electrical cable is one such application requiring significant effort to process the cable ends prior to use. Referring generally to FIG. 1, a typical high voltage electrical cable 10 comprises a central wire or conductor 12 which is covered with a silicone insulation layer 14. A foil layer 15 is helically wrapped around the insulation layer 14, onto which a conductive woven or mesh braiding layer 16 is placed. Finally, an outer silicone insulation layer 18 may be applied over the braiding layer 16. Depending on the application, it may be desired to remove any one or more of these layers to expose an underling layer without contacting the underlying layer and potentially causing damage thereto. This may be particularly challenging when removing each of the silicon insulation layers 14,18 to reveal or expose the conductive braiding layer 16 and/or the central conductor 12.

According to high voltage cable processing of the prior art, a high voltage-cable preparation (HV-CP) machine perform a first rotary cut around the cable in order to partially cut through an outer layer of the cable (e.g., the insulation layer 18 of the representative cable 10). However, due in part to its flexible nature, the cable is typically not perfectly straight during this cutting operation, and the accuracy of the depth of the cut is limited as the cable rotates in a non-concentric manner. Accordingly, this first rotary cut can only be performed to a depth approximately halfway through a thickness of layer, ensuring the blades do not inadvertently contact an underlying layer, for example, the braided metal layer 16 of the cable 10. Once the first rotary cut is made, another cut is performed that "chops" through the remainder of the insulation in a non-rotating manner. As the blades are not rotated in this operation, the detrimental effects of any inherent axial misalignment of the wire or cable are minimized, and the cut can be made with greater precision. This second cut, however, requires significant additional time, and is required on both the outer and inner insulation layers, by way of example.

Accordingly, there is a need for improved systems and methods for accurately and expediently performing these types wire or cable preparation operations.

SUMMARY

In one embodiment of the present disclosure a cutting blade assembly for use with a rotating cable preparation device or machine is provided. The assembly includes a cutting blade defining a cutting edge and adapted to attach to a rotating member of the cable preparation device. The cutting blade assembly is selectively movable in a cutting direction for at least partially cutting a cable held by the device. The assembly further comprises a blade stop arranged adjacent to the cutting edge of the blade and defining a stop surface. The stop surface is positioned at a predetermined distance from the cutting edge of the blade in a direction opposite the cutting direction and extends in a direction generally perpendicular to the cutting direction and generally parallel to an axis of the cable or the rotational axis of the device.

In another embodiment of the present disclosure, a cable processing machine comprises a rotating member rotatable about an axis. A plurality of blade holders of the machine are rotatably attached to the rotating member and support a respective one of a plurality of blade assemblies. Each blade assembly comprises a blade attached to the blade holder, and a blade stop attached to the blade holder and arranged adjacent the blade. The blade stop defines a stop surface arranged at a predetermined distance from a cutting edge of the blade in a depth direction of the blade and extends in a direction generally perpendicular to a cutting direction of the blade. The stop surface is adapted to engage with an outer surface of the cable when the cutting edge of the blade has reached a predetermined cutting depth corresponding to the predetermined distance for limiting the depth of the cut.

BRIEF DESCRIPTION OF THE DRAWINGS

The invention will now be described by way of example with reference to the accompanying Figures, of which.

DETAILED DESCRIPTION OF THE EMBODIMENTS

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Embodiments of the present disclosure are directed to an improved cutting blade assembly for use in a rotating cable preparation machine or device. According to an embodiment, the cutting blade assembly includes a plurality of cutting blades, with each blade having a depth control device or blade stop associated therewith. The blade stop is arranged adjacent to a cutting edge of the blade, and is offset a predetermined distance from the cutting edge in a depth direction of the blade. During processing, with the blade penetrating a wire or cable to the predetermined distance, the blade stop engages with or abuts an outer surface of cable such that the blade is prevented from advancing further into cable, thus limiting the depth of the cut. Moreover, when processing a generally flexible wire or cable, the blade stop acts to bias the cable toward an ideal cutting axis (or its ideal central axis), thus centering the cable with respect to the cutting blades of the cable preparation machine. More specifically, as one of the blade stops makes contact with the cable during a cutting operation, the cable is biased radially toward an ideal axial position and into contact, or into further contact, with a remaining number of additional cutting blades. In this way, the accuracy and precision of the cut achievable by the blades is increased, and potential damage to underlying cable layers is avoided.

Figure 2:
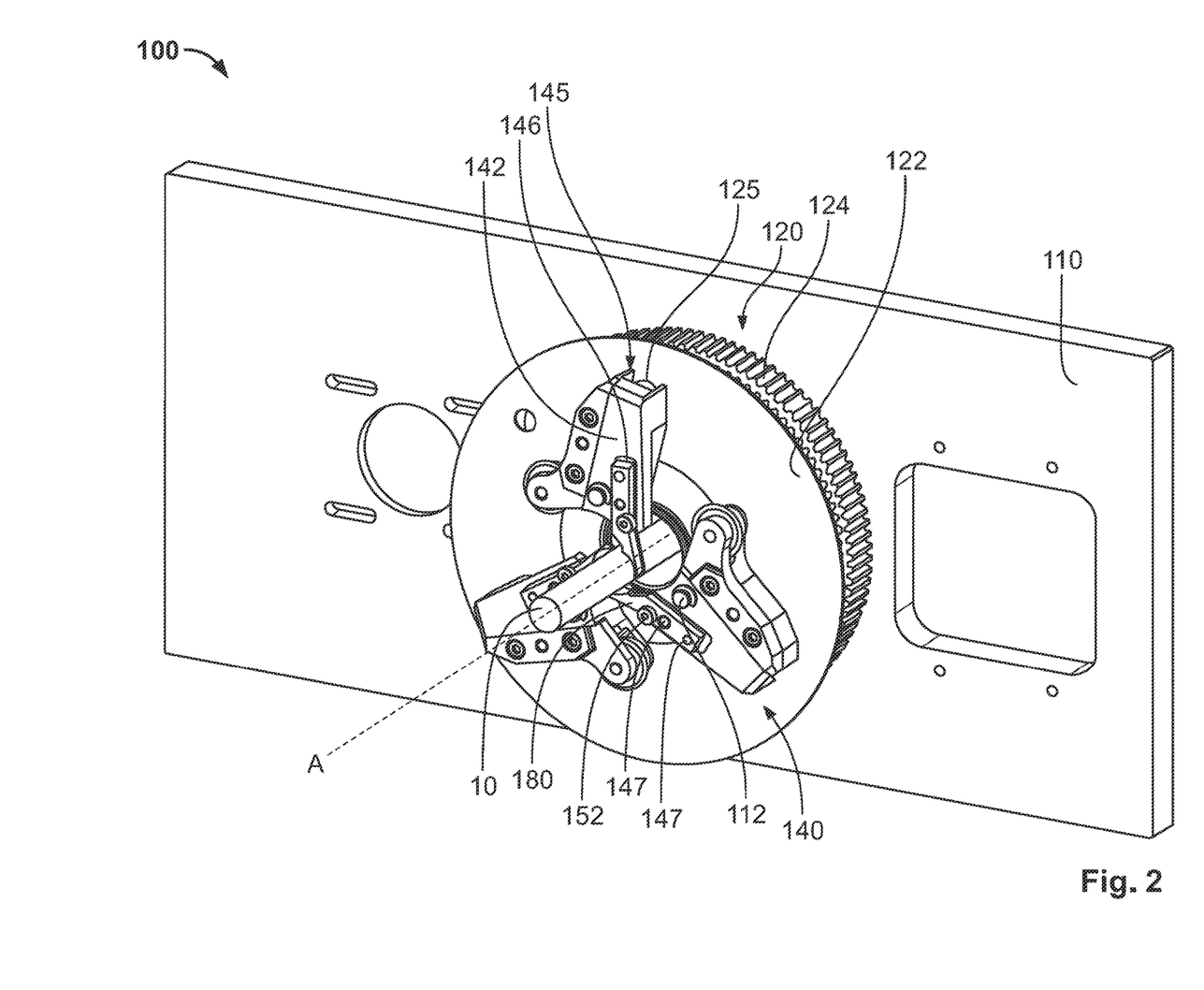
FIG. 2 is a front view of an HV-CP machine utilizing a plurality of cutting depth control devices or blade stops according to an embodiment of the present disclosure for processing a cable.
Figure 3:
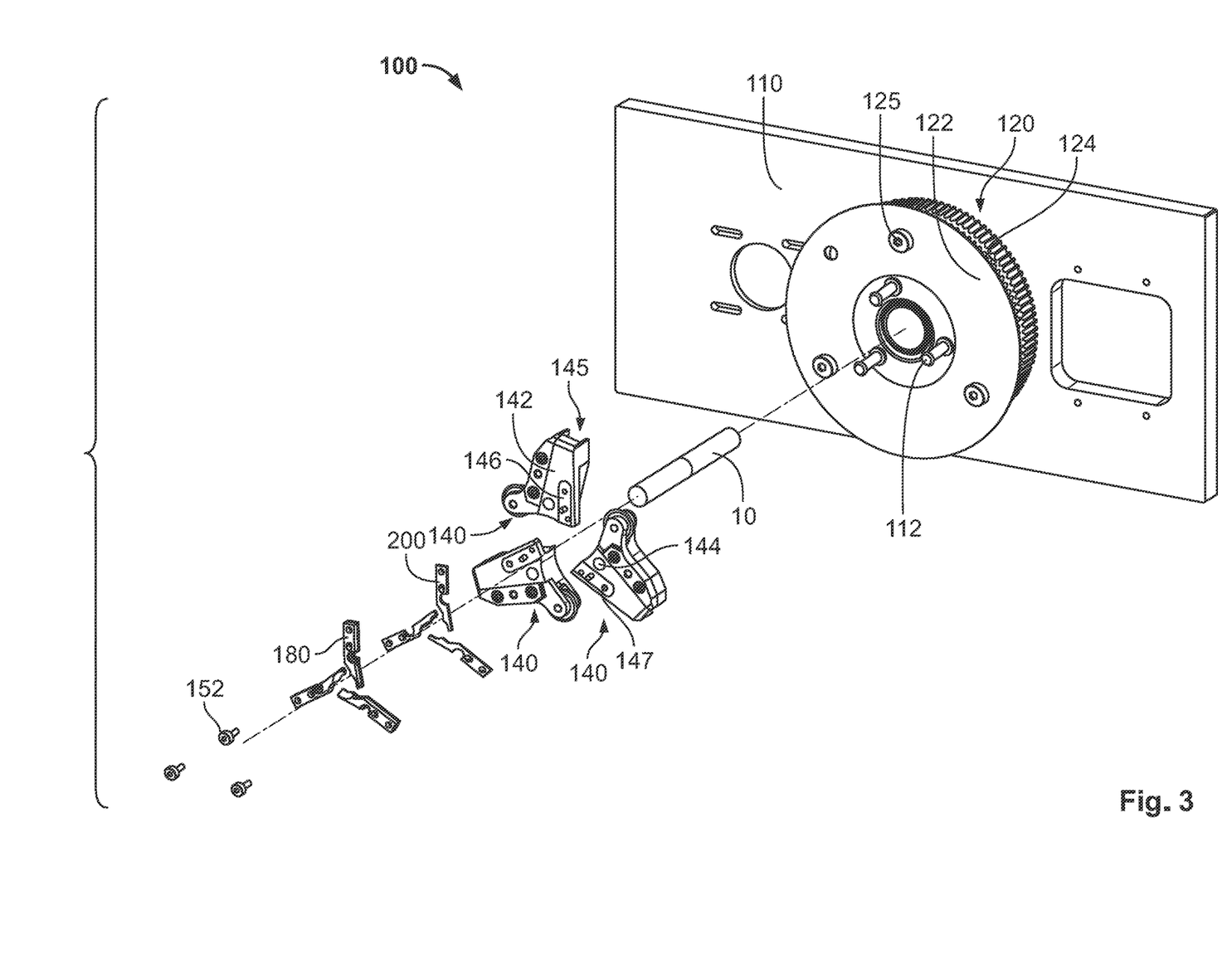
FIG. 3 is a partially exploded view of a cutting assembly of the HV-CP of FIG. 2.

Embodiments of the present disclosure are described herein in the context of their use with an exemplary HV-CP machine. As shown in FIGS. 2 and 3, an HV-CP machine 100 includes a base 110 to which a rotating pulley assembly 120 is mounted. In one embodiment, the pulley assembly 120 includes a first pulley 122 and a second pulley 124, each independently rotatably mounted to the base 110 about a central axis A. The pulleys 122,124 may be belt driven, by way of example only, and comprise central openings along the axis A through which an end of a cable 10 to be processed is passed. The cable 10 may be fixedly held by a camping device (not shown) of the machine 100, such that it is fixed in position relative to the rotating pulley assembly 120.

A plurality of blade holders or cutting heads 140 (e.g., three) are rotatably attached to the pulley 122 via corresponding axles 112. The rotational or radial position of each blade holder 140 is adjustable about the axle 112 for adjusting the position of a corresponding cutting blade 180 attached thereto relative to the cable 10. By way of example only, each blade holder 140 may be operatively connected to the rotating pulley 124 for achieving the rotatory adjustment of the blade holders. Specifically, a cam follower 125 extending from and attached to the pulley 124 may engage with a corresponding aperture 145 formed in an end of a body 142 of the blade holder 140 opposite the axle 112. In this way, altering the relative radial positions of the pulley 122 and the pulley 124 is operative to alter the angle of the cutting head 140 about the axle 112, and thus the position of the blade 180 relative to the cable 10. By connecting blade holder 140 to both the first and second pulleys 122,124 in this manner, the rotational motion of each blade holder 140 about a respective axle 112 is synchronized, ensuring the relative positions of the cutting blades 180 are maintained as they are selectively moved into and out of contact with the cable 10 in the radial directions. The blade holders 140 may also be moveable in an axial direction along the illustrated axis A. In this way, after a cutting operation is performed, cut material may be removed by translating the holders 140 (and the blades 180) axially, pulling the cut material from a remainder of the cable.

Still referring to FIGS. 2 and 3, the body 142 of each blade holder 140 defines an aperture 144 for receiving a respective one of the axles 112 in a rotatable manner. A slot 146 is defined in a front face of the body 142 and is sized to receive a cutting depth control device or blade stop 200 according to an embodiment of the present disclosure, as well as a respective one of the cutting blades 180. One or more locating pins 147 may be arranged within the slot 146 and extend from the front face thereof for engaging with corresponding apertures formed through the blade stop 200 and the cutting blade 180 for fixing their position relative to the blade holder 140. Further, a threaded aperture may be formed into the body 142 in the area of the slot 146 for receiving a fastener 152 for securing the blade stop 200 and the blade 180 to the holder 140.

Figure 4:
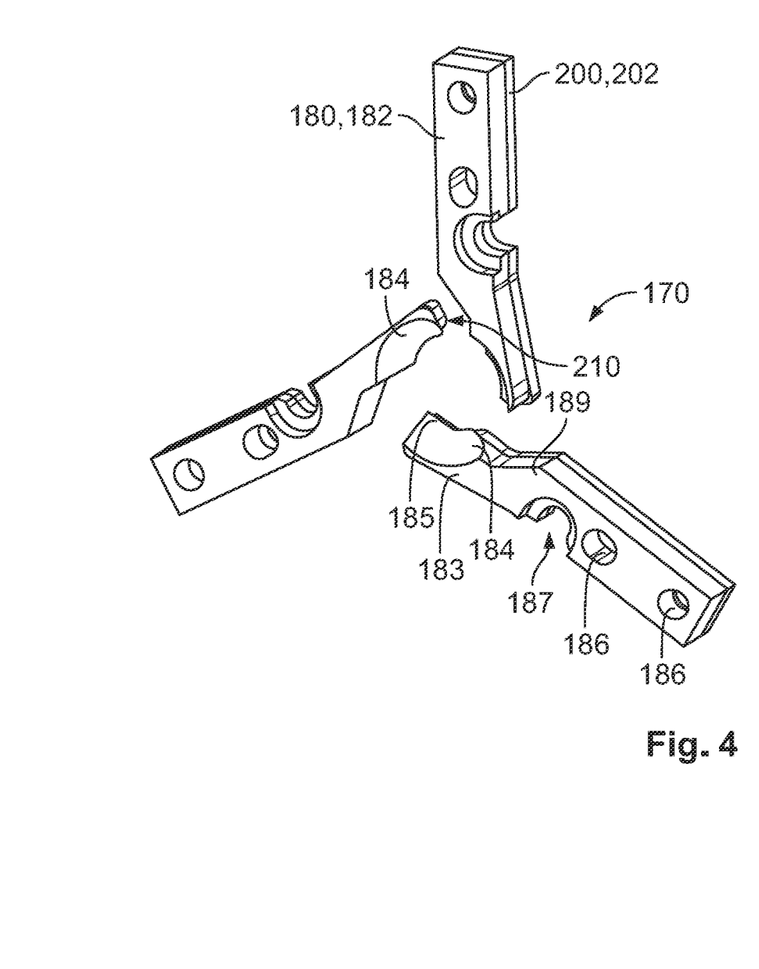
FIG. 4 is an isolated view of a plurality of rotary cutting blades and associated cutting depth control devices according to an embodiment of the present disclosure.

Referring to FIG. 4, a cutting blade assembly 170 according to an embodiment of the present disclosure includes a plurality of pairs (e.g., three pairs) of cutting blades 180 and corresponding blade stops 200. The blade and blade stop pairs are arranged generally 120 degree apart with respect to the central axis of rotation of the cutting machine 100 and/or the ideal axial center of a cable held therein. See axis A of FIG. 2. Each cutting blade 180 includes a body 182 defining a cutting surface 184. In the exemplary embodiment, a cutting or sharpened edge 185 of the cutting surface 184 comprises an arcuate or curved profile defining a portion of a circle, with a radius of curvature defined about a center of the assembly 170, or the rotational axis A of the cutting machine. In this way, as each of the blades 180 converge toward the ideal radial center of a cable, the cutting edges 185 likewise converge to define a continuous or near continuous circular cutting edge (i.e., forming a majority of a circle) for simultaneously engaging with and cutting a majority of an outer circumferential surface of the cable. From the cutting edge 185, the cutting surface 184 defines a curved or partially-spherical profile extending through a thickness of the body 182 toward a front face 183 thereof.

Still referring to FIG. 4, the body 182 further defines a plurality of locating apertures 186 for receiving the locating pins 147 or other locating or keying features of the blade holder 140 for accurately fixing the position of the cutting blade 180 relative to the holder. The body 182 may define a stepped and/or slotted aperture 187 for receiving a respective one of the fasteners 152 in a recessed manner for securing the blade 180 and the blade stop 200 to the holder 140. As illustrated, one or more of the apertures 186,187 may be slotted, elongated over otherwise over-sized in profile, facilitating the fixation of the cutting blades 180 and/or the blade stops 200 of each pair in a number of varying positions, for adjusting a cutting depth of the assembly 170. The body 182 further defines a tapered mid portion 189 such that a width of the body 182 is reduced from an end thereof defining the cutting surface 184 compared to that of the end mounted to the holder 140. The reduced width of the cutting end of the body 182 creates additional clearance, allowing for adjacent blades/stop pairs to be arranged in closer proximity to one another as they converge during a cutting or processing operation. As a result, spacing between adjacent blades can minimized during cutting, improving the cutting quality.

Figure 5:
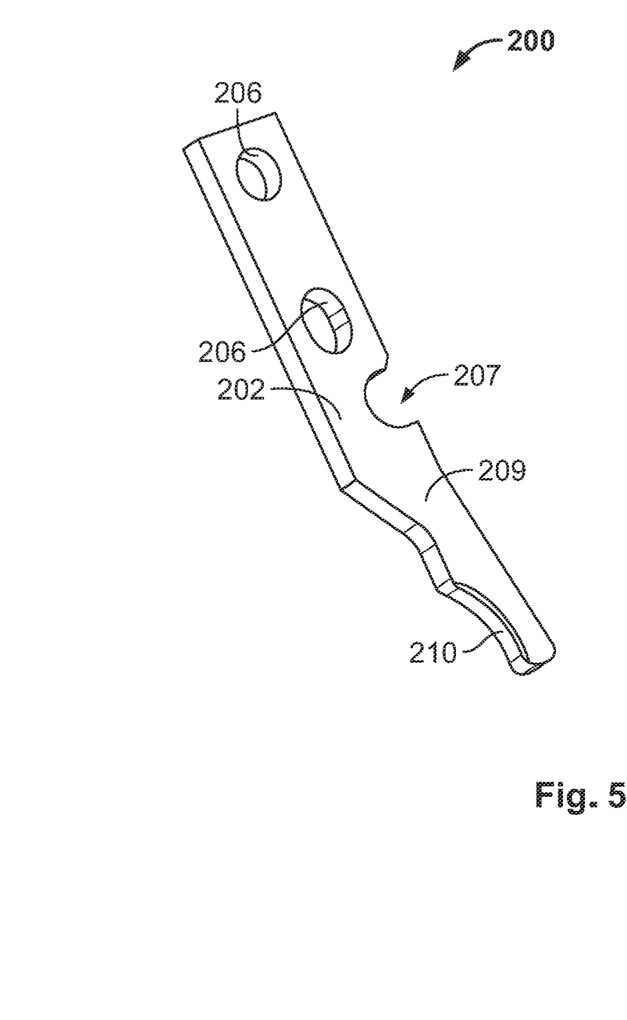
FIG. 5 is a perspective view of one of the cutting depth control devices according to an embodiment of the present disclosure.

With particular reference to FIGS. 4 and 5, the depth control device or blade stop 200 according to an embodiment of the present disclosure includes a body 202 having a profile generally corresponding to or matching that of the body 182 of the blade 180, including a first end having a width and shape corresponding to that of the slot 146 formed in the holder 140, a tapered mid portion 209, and a narrowed second end defining an engaging or stop surface 210. The body 202 of the blade stop 200 further defines locating apertures or openings 206 for receiving the pins 147 of the holder 140, as well as a clearance slot 207 corresponding to the stepped slot 187 of the blade 180 for receiving the mounting fastener 152. As set forth above, the locating openings 186,206 of the blade 180 and/or the blade stop 200 may be slotted such that their fixed positions relative to the holder may be adjusted. Likewise, in some embodiments, only the apertures 206 of the stop 200 may be slotted, permitting the adjustment of the allowable cutting depth of the blade 180 by altering the position of only the blade stop 200.

As described above, the stop or engaging surface 210 of the blade stop 200 is configured to oppose and abut the outer surface of the cable during a cutting operation. Specifically, the stop surface 210 defines a profile that extends in a smooth, linear manner across its thickness, or in a direction parallel to the axis of rotation A of the rotating pulley assembly 120 and/or the axial direction of the cable. The stop surface 210 is further curved in a radial direction of the cable with which is engages, or curved about an axis of curvature coaxial with the axis of rotation A of the cutting machine and/or the cable. In this way, the stop surface 210 defines a curved profile matching that of an outer surface of the cable with which it engages.

Figure 6:
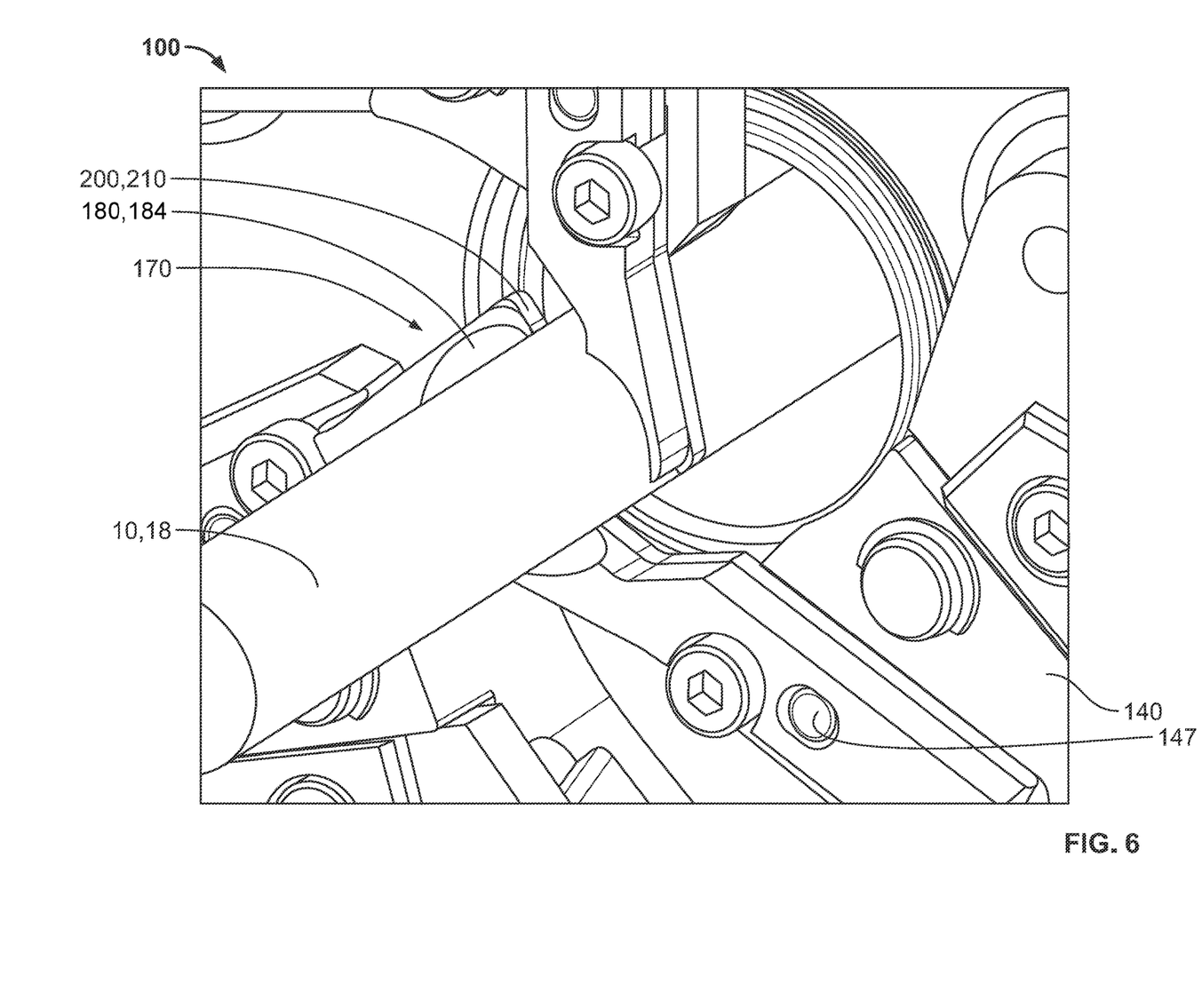
FIG. 6 is a detailed perspective view of the HV-CP machine of FIG. 2 performing a cable processing operation.
Figure 7:
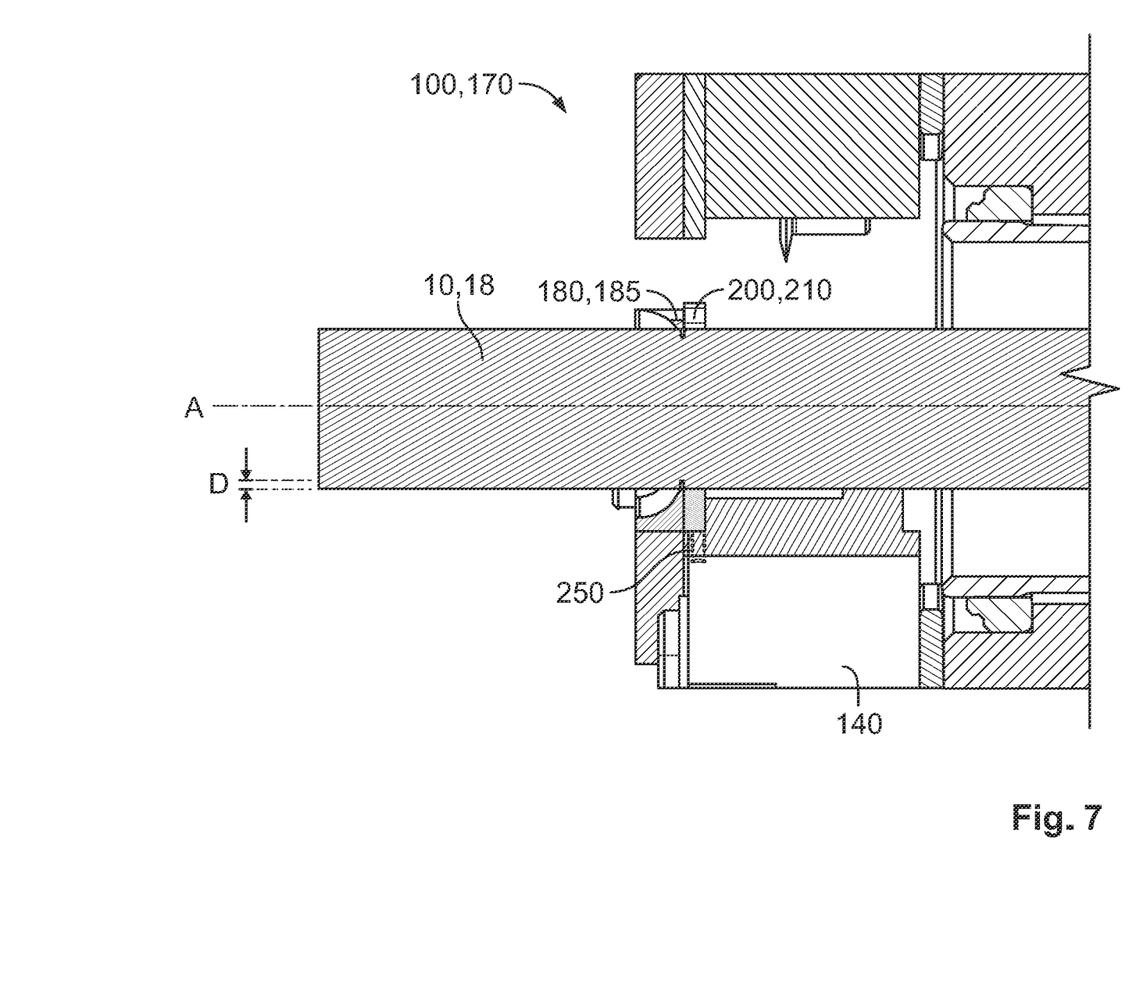
FIG. 7 is a side cross-sectional view of the HV-CP machine of FIG. 2 performing the cable processing operation shown in FIG. 6.

Referring now to FIGS. 6 and 7, the cutting blade assemblies 170 are shown engaged with the cable 10 during a cutting operation performed by the HV-CP machine 100. The cutting blade assemblies 170 are configured to move in radially inward and outward directions relative to the axis of rotation A via a corresponding motion of the blade holders 140. As illustrated, the blade assemblies 170 have been biased radially inward in a cutting direction, with the leading or cutting edges 185 of the blades 180 cutting through the outer insulation layer or sheathing 18 of the cable 10. The stop surface 210 is positioned directly adjacent to the cutting surface 184 of the blade 180 in an installed position, with the stop surface offset from the leading or cutting edge 185 of the cutting blade 180 in a radially-outward direction of the cable, or in a direction opposite the cutting direction. More specifically, the cutting edge 185 of the cutting blade 180 is defined at a vertex defined between a first vertical sidewall of the cutting blade and a second sidewall. In an installed position, the stop surface 210 of the blade stop 200 is arranged directly adjacent to and abutting the first vertical sidewall of the cutting blade 180. By locating the blade stop 200 directly adjacent to the cutting blade 180, the cable is positioned by the blade stop in the most accurate manner with respect to the adjacent blade, minimizing variations resulting from, for example, axial misalignment and/or runout.

A predetermined offset distance D (see FIG. 7) between the leading edge 185 of the blade 180 and the stop surface 210 corresponds to the maximum allowable cutting depth of the blade into the cable. Once the blade has cut to the predetermined depth D, the stop or engaging surface 210 of the stop 200 comes into abutting contacting with the insulation layer 18. After initial contact is made, the stop 200 prevents the blade 180 from engaging further into the insulation layer 18. Further radially-inward motion of the blade assemblies 170 results in the stop surfaces 210 biasing the cable 10 radially inward, or toward its ideal axial center aligned with axis A. More specifically, as the cable 10 is generally flexible, it should be understood that the stop surface 210 acts to center the cable during the cutting operation, biasing the outer periphery of the cable toward an ideal center position. This is particularly important in the cutting of flexible objects, such as a cable, as the lack of rigidity of the cable would otherwise result in the cable being off-center during cutting operations, limiting the accuracy with which the cut can be made, and thus risking damage to the cable, for example, cutting to an undesired depth. Like the cutting blades 180, the arcuate nature of the stop or engaging surfaces 210 of the blade stops 200 converge to form a near continuous support surface for the outer surface of the cable, or at least a support surface simultaneously engaging a majority of an outer circumference of the cable (i.e., forming a majority of a circle). In this way, the cable 10 is likewise supported about its outer perimeter in a uniform fashion, further improving the accuracy of the centering function performed by the blade stops 200, and thus the accuracy and uniformity of the cut.

With particular reference to FIG. 7, in another embodiment of the present disclosure, the blade stops 200 may be pivotally or otherwise movably mounted to the cutting heads 140, and supported in an elastic manner, such as by springs 250. The springs 250 may apply sufficient force on the blade stops 200 such that they operate in the above-described manner, accurately positioning the cable 10 during cutting and preventing cutting to an excess depth. However, as the blade stops 200 are elastically mounted, additional pressure applied in the radially inward direction by the rotation of the holders 140 may be operative to bias the stops 200 in a direction radially away from the cable, permitting a degree of further engagement of the cutting blades 180 into the cable. Likewise, the blade stops 200 may be formed from an elastic material, imparting similar elastic behavior in the radial direction and permitting cutting depths which vary in either direction from an initial offset distance between the stop surfaces 210 and the leading edges of the blades 180. The ability to vary the cutting depth without having to manually reposition the cutting blades 180 and/or the blade stops 200 may be useful to an operator performing the cable processing operations for any number of reasons.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. A cutting blade assembly for use with a cable preparation device, comprising:
 a cutting blade defining a cutting edge and adapted to attach to a rotating member of the cable preparation device, the cutting blade selectively movable in a radial cutting direction with respect to a cable held by the device, the cutting blade including a body having a first end for attaching to a blade holder of the device, a second end defining the cutting edge, and an intermediate portion tapering between the first end and the second end; and a blade stop oriented adjacent to the cutting blade, the blade stop including a body having a first end for attaching to the blade holder, a second end defining a stop surface arranged at a predetermined distance from the cutting edge of the blade in a depth direction of the blade, and an intermediate portion tapering between the first end of the blade stop and the second end of the blade stop, the blade stop is adapted to engage with an outer surface of the cable after the blade reaches a cutting depth through the cable corresponding to the predetermined distance.

2. The cutting blade assembly of claim 1, wherein the stop surface is curved in a radial direction with respect to an axis of rotation of the rotating member.

3. The cutting blade assembly of claim 1, wherein the cutting blade is one of a plurality of cutting blades and the blade stop is one of a plurality of blade stops, with each blade stop arranged adjacent to one of the cutting blades.

4. The cutting blade assembly of claim 3, wherein the plurality of blade stops each have the stop surface, and the plurality of stop surfaces of the plurality of blade stops are sized and shaped so as to define a majority of a circle for simultaneously engaging with an outer circumferential surface of the cable.

5. The cutting blade assembly of claim 4, wherein the plurality of cutting blades each have the cutting edge, and the plurality of cutting edges of the plurality of cutting blades are sized and shaped so as to define a majority of a circle for simultaneously engaging with a majority of the outer circumferential surface of the cable.

6. The cutting blade assembly of claim 3, wherein each of the plurality of cutting blades are rotatable.

7. The cutting blade assembly of claim 1, wherein the cutting edge of the cutting blade is defined at a vertex defined between a first vertical sidewall of the cutting blade and a second sidewall of the cutting blade.

8. The cutting blade assembly of claim 7, wherein the stop surface of the blade stop is arranged directly adjacent to and abutting the first vertical sidewall.

9. The cutting blade assembly of claim 1, wherein the blade stop extends from the body of the blade in a direction generally perpendicular to the radial cutting direction.

10. A cable processing machine comprising:
a rotating member rotatable about an axis; and
a plurality of blade holders rotatably attached to the rotating member, each blade holder having:
a blade defining a cutting edge; and
a blade stop arranged adjacent to the cutting edge of the blade and defining a stop surface, the stop surface offset a predetermined distance from the cutting edge of the blade in a depth direction of the blade and having a semi-circular profile corresponding to that of an outer surface of a cable, the blade stop is adapted to engage with the outer surface of the cable after the blade reaches a cutting depth through the cable corresponding to the predetermined distance.

11. The cable processing machine of claim 10, wherein a cable processed by the machine is held generally axially aligned with the axis of the rotating member.

12. The cable processing machine of claim 11, wherein the blade holders are adapted to simultaneously rotate relative to the rotating member for adjusting a radial position of the blades relative to the cable.

13. The cable processing machine of claim 10, wherein each blade and blade stop are fixed with respect to a respective one of the blade holders via at least one locating pin.

14. The cable processing machine of claim 13, wherein each blade and blade stop are secured to a respective one of the blade holders via a fastener.

15. The cable processing machine of claim 10, wherein each blade stop is adapted to engage with a outer surface of the cable after the blade reaches the cutting depth through the cable corresponding to the predetermined distance.

16. The cable processing machine of claim 10, wherein the plurality of stop surfaces of the plurality of blade stops are sized and shaped so as to simultaneously engage with a majority of an outer circumferential surface of the cable.

17. The cable processing machine of claim 10, wherein the plurality of blade stops are resiliently mounted to the plurality of blade holders in a radial direction with respect to the axis of the rotating member.

18. A cutting blade assembly for use with a rotating cable preparation device, comprising:
a cutting blade adapted to attach to a rotating member of the cable preparation device, the cutting blade selectively movable in a cutting direction with respect to a cable held by the device, the cutting blade defining a cutting edge at a vertex defined between a first vertical sidewall of the cutting blade and a second sidewall of the cutting blade; and
a blade stop defining a stop surface arranged at a predetermined distance from the cutting edge of the blade in a depth direction of blade and directly adjacent to and abutting against the first vertical sidewall of the cutting blade, the blade stop is adapted to engage with an outer surface of the cable after the blade reaches a cutting depth through the cable corresponding to the predetermined distance.

19. The cutting blade assembly of claim 18, wherein the cutting blade is one of a plurality of cutting blades and the blade stop is one of a plurality of blade stops, with each blade stop arranged directly adjacent to one of the cutting blades.

20. The cutting blade assembly of claim 19, wherein a plurality of the cutting edges of the plurality of cutting blades are sized and shaped so as to define a majority of a circle for simultaneously engaging with a majority of the outer surface of the cable.

* * * * *